July 8, 1969   W. W. BREITBARTH ET AL   3,454,101
ELECTRONIC CIRCUIT FOR AUTOMATIC BLADE CONTROL FOR MOTOR GRADERS
Filed June 12, 1967   Sheet 1 of 3
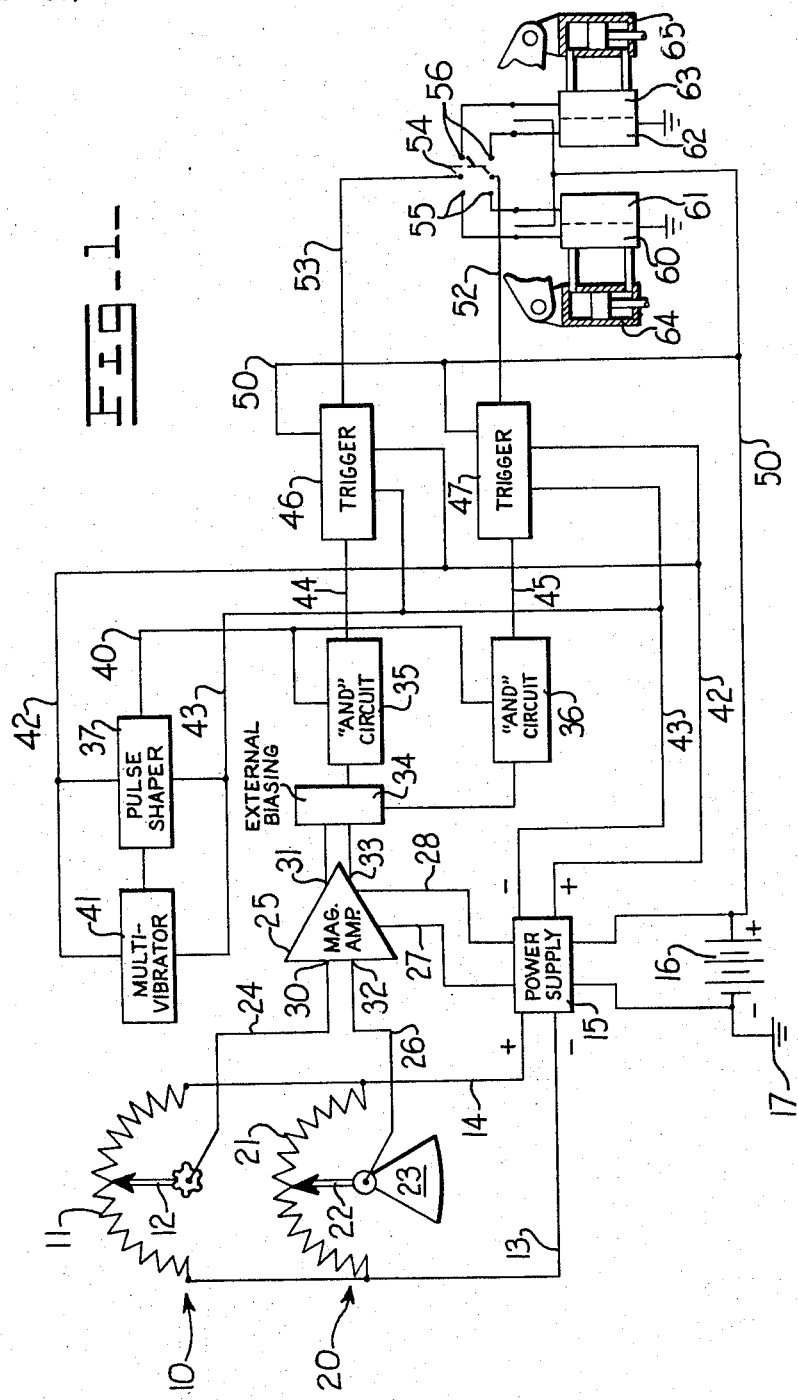
INVENTORS
WILLIAM W. BREITBARTH
JOHN W. CARTER
BY PHILIP J. COSTA
ATTORNEYS

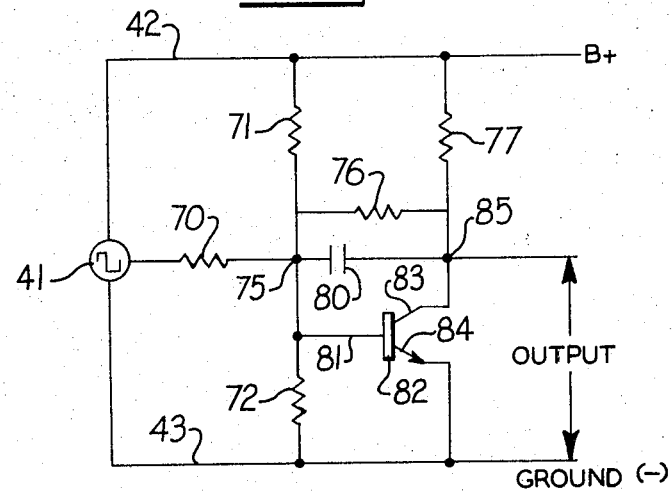
Fig-2-
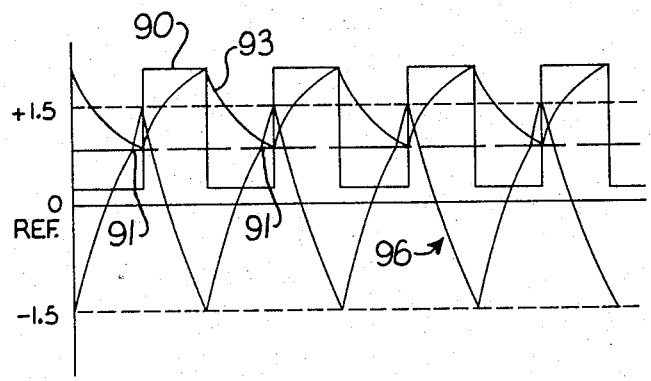
Fig-3-
INVENTORS
WILLIAM W. BREITBARTH
JOHN W. CARTER
BY PHILIP J. COSTA

United States Patent Office

3,454,101
Patented July 8, 1969

3,454,101
ELECTRONIC CIRCUIT FOR AUTOMATIC BLADE CONTROL FOR MOTOR GRADERS
William W. Breitbarth, Metamora, John W. Carter, Peoria, and Philip J. Costa, Chillicothe, Ill., assignors to Caterpillar Tractor Co., Peoria, Ill., a corporation of California
Filed June 12, 1967, Ser. No. 645,460
Int. Cl. E02f 3/76; B64c 13/50
U.S. Cl. 172—4.5            10 Claims

ABSTRACT OF THE DISCLOSURE

A time-base control system for continuously positioning a movable member to maintain it in a preselected position with respect to a reference which generates a first voltage representing the preselected position with respect to the reference and a second voltage representing the actual position of the member with respect to the reference and uses any difference between the two voltages to control the duration of trigger circuits operating a positioning means locating the member to its desired or preset position, said duration of said trigger circuits being directly proportional to the error between the member's actual position and preselected position.

Background of the invention

In many machine operations it is necessary to accurately and continuously position movable elements on vehicles with regard to vertical or horizontal references as the vehicle traverses uneven terrain. Since the vehicle itself does not maintain a constant relationship with vertical or horizontal references, the elements cannot be properly positioned with reference to the vehicle. Therefore an independent reference, which is not affected by vehicle orientation, must be provided for desired control or positioning and the member controlled relative thereto. A vehicle employed in earthmoving operations illustrative of those requiring such control is a motor grader when a particular slope is desired. It can be appreciated that the slope position of the blade of a motor grader with reference to the horizontal must be accurately controlled to achieve a uniform slope on a grade. This is of particular importance when roads are graded to achieve a definite crown in the road for drainage purposes. The control system described herein has particular application to blade control in motor graders but can be employed elsewhere.

Various types of automatic positioning controls for motor graders have been proposed in the past, with most of such control systems generating an error signal in the form of a voltage or current and then moving a movable element to correct or remove the error signal. Normally incorporated with the movable element is a means for generating a feedback signal to cancel the error signal when the element has relocated to the desired position. A control of this type is subject to considerable oscillation or hunting, often requiring damping devices; in addition they tend to be relatively insensitive to small changes in position of the movable element due to a large dead band to reduce oscillations. The hunting is aggravated when the controls are used to position heavy elements as for example, the blade of a motor grader where they require complicated damping structures which reduce sensitivity. Integral and differential action controls have been employed with prior art controls to reduce the hunting but their addition complicates the controls and decreases their reliability. The controlled position of the blade of a motor grader must be free of oscillation or hunting to provide a smooth slope and any hunting in its control can result in unevenness in the finished grade.

In addition to the above requirements, a control system used on construction equipment, such as a motor grader, obviously must be of rugged and trouble-free construction. Thus, the complicated voltage and current controls using proportional, integral and derivative action cannot be satisfactorily employed. Shock and vibration will be present in the control's physical environment and, thus, complicated electronic circuits that require constant adjustment and calibration cannot be employed since they are very susceptible to physical shock and skilled technicians are not available in the field for servicing.

Summary of the invention

The present invention solves the above problems by providing a rugged and simple time-based control wherein the error signal in the form of a voltage is added to a periodically occurring pulse whose amplitude is set slightly above the operating level of a trigger circuit. The pulse is shaped so that the addition of a slight error signal will cause the trigger circuit to operate for a longer duration, and the period of operation of the trigger circuit can then be used to effect the positioning of the grader blade. Thus, for a larger error signal the trigger circuit will remain in an operating condition for a longer period and effect a greater movement of the grader blade. The trigger circuit in turn is used to control the fluid control valves through solenoids that control the flow of hydraulic fluid to hydraulic rams that position the blade of the motor grader.

This system also includes a means of eliminating hunting of the control in order that the grader blade will smoothly approach its desired position without oscillation or overshooting. This is accomplished by the invention's ability to provide a time-modulated control pulse that becomes shorter and shorter as the blade approaches its desired position. For larger error signals the duration of the control pulse is longer, and the speed of movement of the blade will be faster, reducing as the blade approaches the selected position.

Brief description of the drawing

The above advantages of this invention and its operation will be more easily understood from the following detailed description of a preferred embodiment in which:

FIG. 1 is a block diagram of the control circuit of this invention;

FIG. 2 is a schematic circuit diagram of the circuit that controls the width or time base of the time-modulated control pulses;

FIG. 3 shows the wave form of the time-modulated control pulses; and

Description of a preferred embodiment

Figure 4:
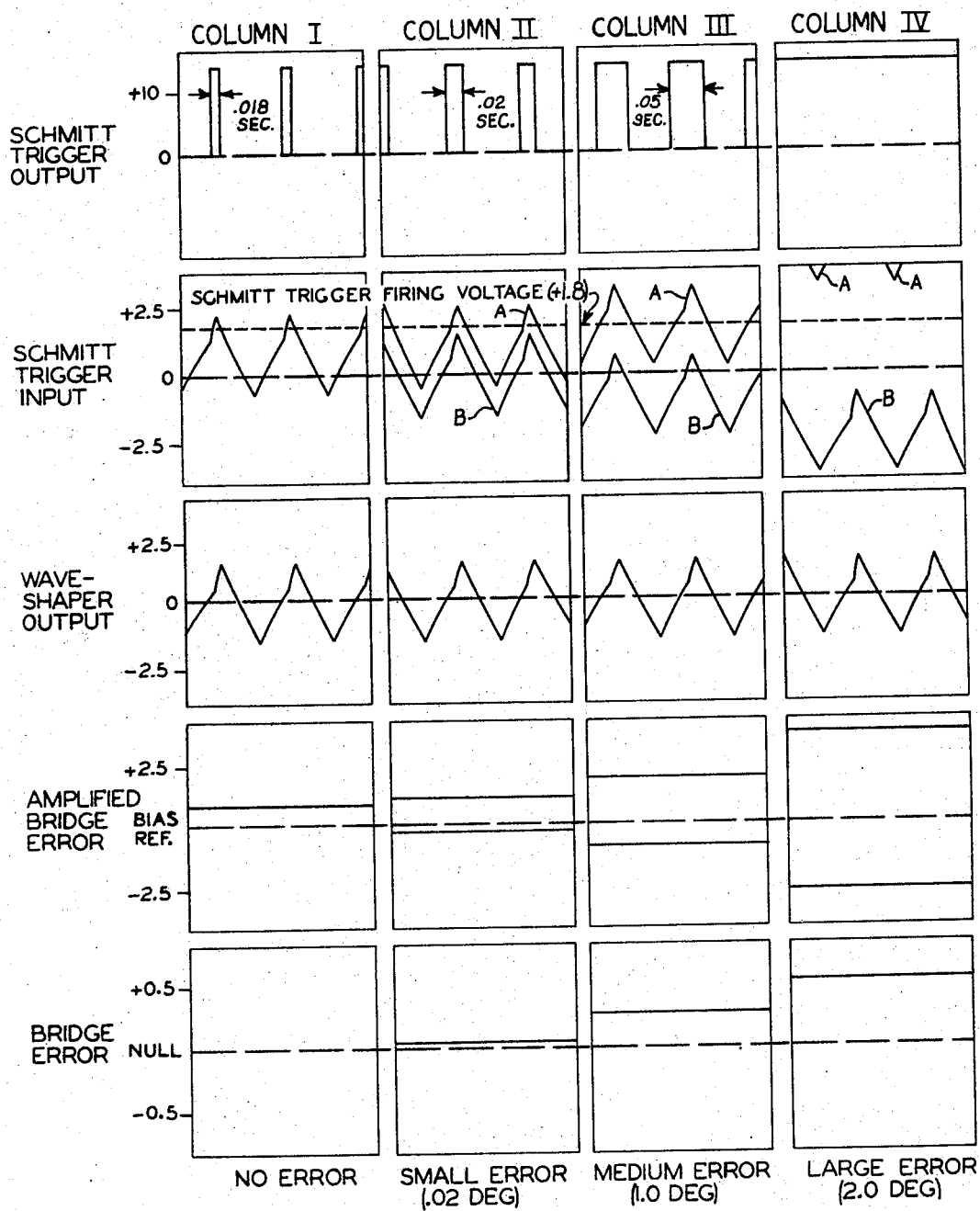
FIG. 4 shows a series of wave forms of various signals that appear at various points in the circuit of FIG. 1.

As explained above, the present invention is directed to a positioning-control system, particularly adapted to position a rather massive element, such as the blade of a motor grader. While the invention is described with particular reference to the positioning of a blade of a motor grader, it obviously can be used to position any relatively heavy, movable element. The system senses the actual position of the movable element relative to a reference position and its selected position relative to the reference and creates an error signal which is combined with the time-modulated pulses to control the duration of trigger circuits operating positioning means.

Referring to FIG. 1, there is shown slope potentiometer 10 controlled by the operator by which the operator can set a desired preselected blade slope with respect to a vertical reference plane by manually adjusting the wiper 12 of this potentiometer on its resistor 11. The ends of this resistor are connected by means of leads 13 and 14 to a power supply 15 so that wiper position selected a control voltage. The power supply is powered by a battery 16 whose negative terminal is grounded at 17. This power supply is a conventional integrated power supply which is capable of supplying both the regulated direct current required for the control potentiometers, as well as the direct current for operating the remainder of the electronic circuitry. In addition, the power supply should include an oscillating circuit that is capable of supplying the AC power for the magnetic amplifier 25 described below.

A reference potentiometer 20 has its resistor 21 similarly coupled to leads 13 and 14 so it is connected in parallel with the potentiometer 10. This reference potentiometer provides a vertical reference by mounting its resistor in a fixed position on the blade of the motor grader and attaching its wiper 22 to a pendulum counterweight 23 in order that it may sense blade's position with reference to true vertical. Thus, any variation or movement of the blade with respect to vertical will cause the wiper to move relative to its resistor. A signal generated by the reference potentiometer will thus be related to the angle between the blade and the vertical reference plane.

The wiper of slope potentiometer 10 is coupled by means of a lead 24 to one input of a magnetic amplifier 25, while the wiper 22 of reference potentiometer 20 is coupled by means of lead 26 to its other input. The two potentiometers form a bridge circuit that is balanced when the blade is at a "controlled" position with the two wipers having a positive potential with respect to ground. If either wiper changes position on its resistor the balance is destroyed and a potential difference will exist between the two wipers. The polarity of the potential difference will depend upon the direction in which the wipers have been displaced.

For example, if the wiper 12 is mover clockwise reducing the resistance between its contact point and the positive conductor, and increasing its resistance between its contact point and the negative conductor, the wiper 12 will become positive with respect to the wiper 22. Thereafter, if the wiper 22 is rotated in a clockwise direction (or its resistor 21 is rotated in a counterclockwise direction) until the resistance between the contact point on the wiper 22 and the positive conductor equals the resistance between the wiper 12 and the positive conductor the circuit will be again balanced. In a similar manner, if the wiper 22 is rotated in a clockwise direction so as to reduce the resistance between its contact point and the positive conductor, the wiper 22 will become positive with respect to the wiper 12. Thus, the polarity of the voltages appearing on the conductors 24 and 26 can either be equal or one can have a greater positive value than the other, the other being considered a negative value.

From the above description it can be appreciated that the operator can set the desired slope of the blade with respect to a vertical plane by moving the wiper of the slope potentiometer. Any deviation of the blade from the desired slope because of a change in attitude of the motor grader will then be sensed by the reference potentiometer and the blade will be moved to compensate for any changes, so the desired slope will be maintained.

The magnetic amplifier 25 is coupled to the power supply 15 by means of leads 27 and 28. Normally, the magnetic amplifier is powered with a relatively low frequency AC power, for example 400 cycles per second AC voltage. When the bridge circuit formed by the two potentiometers is balanced as described above, no potential difference will exist between the inputs at the points 30 and 32 from the wipers, resulting in no amplification through the magnetic amplifier.

If the bridge circuit becomes unbalanced due to a change in the wipers' relative positions with respect to their resistors, indicating a change is required in blade position to maintain the desired slope of the blade, a difference in potential will occur between the inputs 30 and 32 to the magnetic amplifier. This error voltage will cause a current to flow through the amplifier with a direction and magnitude depending upon the polarity and magnitude of the potential difference. The error signal will be amplified within the magnetic amplifier and the resulting signal will appear at the output as a DC voltage at the outputs 31 and 33.

In order to remove the dead band of the "and" circuits more fully described below, an external biasing source 34 is coupled to the outputs 31 and 33 of the magnetic amplifier 25. This external biasing source applies a biasing voltage of a positive 0.8 volt with respect to ground to the output terminals 31 and 33 of the magnetic amplifier. Since the biasing voltage is applied to both outputs it merely acts as a constant, not affecting the operation of the amplifier.

When the magnetic amplifier 25 senses a positive voltage at the point 30, it amplifies the signal and shifts the output voltage at point 31 to a more positive value, while shifting the output voltage at the point 33 in a negative direction. As greater and greater error signals are generated in the bridge circuit, the potential of point 30 will become more and more positive and the amplified output voltage at point 31 will become more positive, while the amplified output at point 33 becomes more negative. The opposite action will take place if the potentiometer wipers or resistances are moved so as to cause the voltage at the point 32 to become more positive than the voltage at the point 30.

The output voltages at the points 31 and 33 after passing through external biasing circuit are then supplied to the "and" circuits 35 and 36, respectively, as a first voltage. The "and" circuits are a series-connected resistor and capacitor and are used to sum two voltages. The second voltage impressed upon the "and" circuits is supplied by the pulse-shaping circuit 37 that is connected to the two "and" circuits by means of a conductor 40. The pulse-shaping circut 37 receives a series of uniform square wave pulses from a multivibrator 41 which are both powered through leads 42 and 43 from the power supply 15. The multivibrator is preferably a transistor version of a conventional vacuum tube multivibrator. The pulse-shaping circuit supplies a triangular-shaped voltage and more particularly, a triangular-shaped voltage that has a decreasing pulse width as it increases in amplitude. The peak of the triangular-shaped pulse is narrower in proportion than the base. This type of pulse shape provides a proportional control as described more fully below.

The "and" circuits add the triangular-shaped pulse (the second voltage) received from the pulse-shaping circuit to the signal (the first voltage) received from the external biasing circuit, being a combination of the bias and magnetic amplifier output. The summed voltages are then supplied to Schmitt trigger circuits 46 and 47, respectively. One "and" circuit is connected to each trigger so that "and" circuit 35 is coupled by means of a lead 44 to the Schmitt trigger 46, while the "and" circuit 36 is coupled by means of a lead 45 to the Schmitt trigger 47. The Schmitt trigger circuits are powered by means of the leads 42 and 43 connected to the power supply.

Preferably the Schmitt trigger circuits 46 and 47 are a transistorized version of the conventional vacuum-tube Schmitt trigger circuit and are coupled to the positive battery terminal by a lead 50. The function of the Schmitt triggers is to control the flow of current to the solenoid actuated valves, as described below.

The output of one Schmitt trigger 46 is coupled by means of a lead 53 to one terminal of a double-pole, double-throw switch 54 and similarly, the output of the other Schmitt trigger 47 is coupled by means of a lead 52 to the other terminal of the double-pole, double-throw switch 54. The two stationary terminals 55 of the switch 54 are coupled to the up-solenoid 60 and down-solenoid 61, respectively, of one of the lift cylinders 64 on one side of the motor grader blade. Similarly, the other two contacts 56 of the switch 54 are coupled to the up-solenoid 63 and the down-solenoid 62, respectively, of the other lift cylinder 65 of the motor grader blade. This arrangement permits the operator to position the double-throw switch 54 to employ the lift cylinder at either end of the blade to position the blade. Thus, one end of the blade will remain fixed while the slope is controlled by movement of the other end of the blade. Note that separate solenoids are used for up and down control.

The switching action of the Schmitt trigger which sends battery power to the solenoids is controlled by the bias voltages received from the two "and" circuits. When the voltages are negative or have a small positive value with respect to ground, the Schmitt triggers are "off" and no current flows between the lead 50 and either of the leads 52 and 53 to the solenoids. Whenever the bias voltage of either Schmitt trigger exceeds a positive 1.8 volts in the embodiment shown, the triggers will switch "on" and complete a current path between the battery and their associated solenoid. Each trigger will remain in an "on" condition until the bias voltage falls below a positive 1.8 volts, at which point the trigger will turn "off." Thus the duration that the trigger is on depends on the time the bias exceeds 1.8 volts. This "on" duration is controlled jointly by the pulse shape, plus the error signal.

A pulse-shaping network based on a resistor-capacitor integration network is shown in FIG. 2 while FIG. 3 illustrates the wave shapes at various points in the circuit. A square wave of voltage as shown by the trace 90 of FIG. 3 is supplied to the network from a conventional multivibrator 41 and is fed through a resistor 70 to a junction 75. This junction is positively biased via the lead 42 through resistors 71, 76 and 77 and coupled to ground lead 43 through a resistor 72. A capacitor 80 is connected in parallel with the resistor 76 and to ground through the NPN transistor 82. Thus the square wave voltage entering the network builds up at the junction as a function of the capacitance of the capacitor and resistance of NPN transistor.

Using the characteristics of the NPN transistor 82, the collector 83 is connected to a positive voltage supply and emitter 84 to a negative source and the base to a voltage source more positive than the collector, so a small current will flow from the base to the emitter while a very much larger current will flow from the collector to the emitter. Thus, when the transistor is connected to the capacitor-resistor network as shown the output of he capacitor-resistor network will be supplied to the base of the transistor to provide a threshold voltage. As the voltage at the junction 75 rises, the transistor conducts and connects the point 85 to ground reducing the positive voltage at this point. This increases the voltage drop across resistor 76 and capacitor 80 so more current flows through the resistor and transistor to ground which tends to limit the positive voltage at the junction and results in a straight-line rise in the voltage at this point.

When the impressed voltage at the junction 75 starts its negative excursion, the transistor shuts off allowing the voltage at point 85 to rise. This results in a decreasing voltage across the resistor 76 which slows the discharge of capacitor 80 and allows the voltage at the junction to decrease in a straight line. The switching of the transistor helps shape the integrator voltage wave form 93 and produces the output pulse shape 96. Also, the transistor will bias its own base by inverse feedback through resistor 76 and capacitor 80.

In the network the switching of the transistor also produces a knee 91 in the positive sweep of the voltage trace of the pulse-shaper output. This knee provides a steeper voltage rise (voltage spike) at the peak of the triangular wave 96 than at the base. This voltage spike can be used to actuated the triggers for a short duration in the area of the knee, if the triggers are set to turn "on" in the range of this bias for small errors. However, below the knee pulse width increases rapidly and larger errors force the knee voltage well above the firing threshold of the triggers, giving longer "on" durations. Thus a proportional type of circuit is provided for accurate positioning of the blade without the typical hunting that is characteristic of most servo-loop mechanisms, when positioning a heavy object, such as a motor grader blade.

*Operation*

The operation of the control system can be better understood by referring to the traces shown in FIG. 4. The traces are divided into four separate columns to illustrate the system's response for no error, small error (0.2 degree), medium error (1.0 degree) and larger error (2.0 degrees). The lowest series of traces illustrate the unbalance voltage of the bridge formed by the two potentiometers which is amplified through the magnetic amplifier that supplies the two voltages appearing in the next lowest series of traces. In the left-hand column there is no error signal and the magnetic amplifier output voltages are a positive 0.8 volt as a result of the external biasing circuit. These voltages are added to the voltages from the pulse shaper in the two "and" circuits to obtain the input voltages for the Schmitt triggers shown in the fourth series of traces. As shown, both "and" circuits reach positive excursions of 2.3 volts. Since the Schmitt triggers turn on at 1.8 volts, both Schmitts will turn on during the time period that the "and" circuit voltages exceed a positive 1.8 volts. This will complete the circuit from the battery to both solenoid coils during this time period. The voltage spikes applied to the solenoid coils are shown in the fifth series of traces. The solenoid-operated valves 60–63 require a response time of 0.20 second to operate, and the duration of the voltage spikes as shown in FIG. 4 is only .018 second. Thus, the solenoid valves do not open and the blade is not moved when no error signal exists.

The very slight difference between the duration of the voltage spikes and the response time of the solenoids provides a quick responsiveness for the system. The slightest unbalance of the bridge circuit produces a signal at the appropriate solenoid-actuated valve of sufficient duration to cause activation of the valve and a resultant blade movement. This quick response of the control substantially eliminates any dead band zone of the system since the valves are being pulsed continuously but not quite opened.

The sensitive response of the control is illustrated in the second column of traces shown in FIG. 4 where a 0.2 degree blade-angle error is introduced. This results in point 30 becoming about .05 volt more positive than point 32, as shown in the first set of traces. As a result, the magnetic amplifier output 31 is shifted in a positive direction 0.3 volt and output 33 is shifted in a negative direction 0.3 volt with respect to zero reference or bias voltage, as shown in the second set of traces. When the output voltages at 31 and 33 are added to the voltage from the pulse-shaper circuit, the outputs from the "and" circuits 35 and 36, shown in the upper set of electrical traces in the second column are obtained. The input to the Schmitt trigger 46 will exceed 1.8 volts (trace A in the second column) for a sufficient duration, as shown in the upper set of traces, to cause the solenoid-actuated valve to operate. At the same time the input voltage to Schmitt trigger 47 will be below 1.8 volts, and it will be completely turned off (trace B in the second column).

When larger errors are introduced they produce longer-duration pulses as shown in the remaining third and fourth columns. For example, when 1.0 degree error is introduced (third column) a pulse duration of .05 second will be operable on the Schmitt trigger. This will maintain the solenoid valve open for a longer period and effect a greater correction of the blade angle.

The actual wave form provides the proportional control automatically. For example, as a larger portion of the wave form moves above the firing voltage of the triggers the greater the duration of valve actuation. As can be seen in the fourth column trigger 46 will remain "on" until the large error is reduced. This ensures rapid and accurate response. slowing as the desired blade position is approached.

The above description of the operation assumed that an error signal results in the voltage at point 30 becoming more positive. It is, of course. apparent that the Schmitt trigger circuits must be connected to the proper solenoid valves to move the blade in a direction to reduce the bridge error signal.

What is claimed is:

1. A time-base positioning control for movable members, said control comprising:
   - means for generating a first voltage representative of the desired position of the movable member with respect to a reference;
   - means for generating a second voltage representative of the actual position of the movable member with respect to said reference;
   - an amplifier, said first and second voltages being supplied to said amplifier. said amplifier supplying two amplified outputs related to said first and second voltages;
   - a multivibrator, said multivibrator generating a series of square-wave voltage pulses;
   - a pulse-shaping circuit, said multivibrator being coupled to said pulse circuit to convert said voltage pulses to triangular voltage pulses;
   - first and second "and" circuits, one of the amplified outputs being supplied to said first "and" circuit, the other of said amplified outputs being coupled to said second "and" circuit, said pulse-shaping circuit being coupled to both said first and second "and" circuits;
   - a first and second trigger circuit, said first and second "and" circuits being coupled to said first and second trigger circuits; and
   - a first positioning means to move said movable member in one direction, a second positioning means to move said movable member in the opposite direction, said first trigger circuit being coupled to said first positioning means and said second trigger circuit being coupled to said second positioning means.

2. The time-base positioning control of claim 1 wherein said amplifier comprises a magnetic amplifier, a biasing voltage, said biasing voltage being added to the outputs of said magnetic amplifier to remove the dead band from said magnetic amplifier.

3. The time-base positioning control of claim 1 wherein said pulse-shaping circuit includes components to proivde a steeper voltage rise at the peak of the triangular-shaped voltage than at the base of said triangular-shaped voltage.

4. The time-base positioning control of claim 1 wherein said first and second positioning means each include solenoid actuated valves that control the flow of fluid to opposite ends of a double-acting fluid-positioning means.

5. The time-base positioning control of claim 2 wherein said solenoid actuated valves have a response time that exceeds the on cycle of said trigger circuit when said magnetic amplifier outputs are equal.

6. An automatic positioning system for positioning the blade of a motor grader at a preselected slope wherein the blade is positioned by a hydraulic means, said positioning system comprising:
   - a slope potentiometer means for setting the desired position of the blade with respect to vertical;
   - a reference potentiometer means, the resistor of said reference potentiometer being mounted to move with the controlled blade on the frame of the motor grader, the wiper of said reference potentiometer being coupled to a pendulum means to provide a vertical reference, the resistors of said slope and reference potentiometers being coupled to form a bridge circuit;
   - a pulse-producing means for producing uniform trianglar-shaped pulses of constant frequency;
   - first and second summing means, the wipers of said slope potentiometer being coupled to said first summing means, the wiper of said reference potentiometer means being coupled to said second summing means, said pulse-producing means being coupled to both said first and second summing means;
   - first and second trigger means, said first and second summing means being coupled to said first and second trigger means; and
   - first and second solenoid actuated valves, said solenoid actuated valves being disposed to control the flow of hydraulic fluid to said hydraulic-positioning means to move said blade in opposite directions, said first and second trigger means being coupled to said first and second solenoid valves to control said valves.

7. The automatic positioning system of claim 6 wherein the wipers of said slope and reference potentiometers are supplied to the input of a magnetic amplifier, the output of said magnetic amplifier are supplied to said first and second summing means.

8. The automatic positioning system of claim 7 wherein a biasing voltage is added to the output signals of said magnetic amplifier.

9. The automatic positioning system of claim 6 wherein the amplitude of the output voltages of said first and second summing means under zero error conditions exceeds the firing voltage level of the trigger circuits for a time duration that is shorter than the response time of the solenoid valves.

10. A control system for maintaining the slope of a blade on a motor grader at a selected angle with reference to vertical comprising:
   (a) slope setting means for generating a first electrical signal representing the desired slope of the blade;
   (b) referencing means mounted on said blade having a vertical sensing member cooperating with an electrical element therein to generate a second electrical signal representing blade position with reference to vertical;
   (c) summing means for combining said said first and second electrical signals for a resultant signal;
   (d) shaped pulse generating means for generating a series of triangular-shaped pulses;
   (e) two trigger means each connected to solenoids actuating fluid control valves and coupled to receive said triangular-shaped pulses, said pulse actuating said trigger means for a duration less than the response period of said solenoids; and
   (f) means for adding said resultant signal to said triangular-shaped pulses whereby the duration of one trigger actuation is greater than the response period of its solenoid whereby said blade will articulate to reduce the magnitude of said resultant signal.

References Cited

UNITED STATES PATENTS

| | | | |
|---|---|---|---|
| 3,026,638 | 3/1962 | Hayner et al. | 172—4.5 |
| 3,229,391 | 1/1966 | Breitbarth et al. | 172—4.5 |

ROBERT E. PULFREY, *Primary Examiner.*

STEPHEN C. PELLEGRINO, *Assistant Examiner.*

U.S. Cl. X.R.

91—459; 137—487.5; 244—77